United States Patent
Katsin

(10) Patent No.: US 7,601,655 B2
(45) Date of Patent: Oct. 13, 2009

(54) ENGINEERED TOWELING

(75) Inventor: Daniel H. Katsin, Mill Valley, CA (US)

(73) Assignee: Tactix LLC, Mill Valley, CA (US)

( * ) Notice: Subject to any disclaimer, the term of this patent is extended or adjusted under 35 U.S.C. 154(b) by 0 days.

(21) Appl. No.: 10/672,978

(22) Filed: Sep. 27, 2003

(65) Prior Publication Data

US 2005/0069672 A1 Mar. 31, 2005

(51) Int. Cl.
D04B 1/14 (2006.01)
D03D 15/00 (2006.01)
B32B 5/26 (2006.01)

(52) U.S. Cl. ............... 442/192; 442/199; 442/308; 442/312; 442/318; 442/319; 428/92; 428/97; 428/903

(58) Field of Classification Search .......... 442/308, 442/312, 318, 319; 428/903
See application file for complete search history.

(56) References Cited

U.S. PATENT DOCUMENTS

| | | | |
|---|---|---|---|
| 3,342,613 A | 9/1967 | Schelhorn | |
| 3,938,570 A | 2/1976 | Stewart | |
| 4,071,921 A | 2/1978 | Jury | |
| 4,146,663 A | 3/1979 | Ikeda et al. | |
| 4,303,187 A | 12/1981 | Berman | |
| 4,355,066 A | 10/1982 | Newman | |
| 4,468,428 A | 8/1984 | Early et al. | |
| 4,596,244 A | 6/1986 | Jackson | |
| 4,913,176 A | 4/1990 | DeNiro | |
| 4,923,454 A | 5/1990 | Seymour et al. | |
| 4,959,881 A | 10/1990 | Murray | |
| 5,023,982 A | 6/1991 | Mehan | |
| 5,227,228 A | 7/1993 | Newell | |
| 5,291,617 A | 3/1994 | Moretz | |
| 5,331,705 A | 7/1994 | Melov | |
| 5,377,378 A | 1/1995 | Cutler | |
| 5,393,602 A | 2/1995 | Urry | |
| 5,398,424 A | 3/1995 | Corcoran | |
| D363,404 S | 10/1995 | Cute | |
| 5,520,672 A | 5/1996 | Urry | |
| 5,535,467 A | 7/1996 | Ciske | |
| 5,618,082 A | 4/1997 | Jachmich | |
| 5,640,721 A | 6/1997 | Jackson | |
| 5,666,679 A | 9/1997 | Ruddy | |
| 5,708,982 A | 1/1998 | Armani | |
| 5,720,043 A | 2/1998 | White, Sr. | |

(Continued)

FOREIGN PATENT DOCUMENTS

EP   19931192   10/2000

(Continued)

OTHER PUBLICATIONS

The Rag Company, Microfiber Links, website at fibersource.com.

(Continued)

Primary Examiner—Jenna-Leigh Johnson
(74) Attorney, Agent, or Firm—Dergosits & Noah LLP

(57) ABSTRACT

The present invention is directed to an article of manufacture for drying or wiping a surface. In one embodiment, a two-layered article is described. In another embodiment a multiple layered article is described.

19 Claims, 2 Drawing Sheets

U.S. PATENT DOCUMENTS

| | | |
|---|---|---|
| 5,724,698 A | 3/1998 | Mondragon |
| 5,758,373 A | 6/1998 | Bloetjes |
| 5,761,761 A | 6/1998 | An |
| 5,762,734 A | 6/1998 | DeLucia et al. |
| 5,774,912 A | 7/1998 | Dominique |
| 5,797,142 A | 8/1998 | Debronsky, Jr. |
| 5,804,274 A | 9/1998 | Nordin |
| 5,806,925 A | 9/1998 | Hanley |
| 5,817,379 A | 10/1998 | Rich |
| 5,855,021 A | 1/1999 | Somerville |
| 5,902,661 A | 5/1999 | Oster |
| D412,234 S | 7/1999 | Cox |
| 5,920,909 A | 7/1999 | Ellsworth |
| 5,927,489 A | 7/1999 | Carswell |
| 5,966,757 A | 10/1999 | Sullivan |
| 6,061,849 A | 5/2000 | Seals |
| 6,108,855 A | 8/2000 | DeLeon |
| 6,131,995 A | 10/2000 | Smith |
| 6,139,929 A | 10/2000 | Hayton |
| 6,148,464 A | 11/2000 | Shioda |
| 6,156,410 A | 12/2000 | Bassler |
| 6,170,100 B1 | 1/2001 | Le Gette |
| 6,175,964 B1 | 1/2001 | Adler |
| 6,186,155 B1 | 2/2001 | Cheek |
| 6,247,505 B1 | 6/2001 | Wörman |
| 6,256,840 B1 | 7/2001 | Elliott |
| 6,258,455 B1 | 7/2001 | Clarke |
| 6,276,828 B1 | 8/2001 | Otley |
| 6,282,741 B1 | 9/2001 | Manning |
| 6,292,949 B1 | 9/2001 | Chang |
| 6,351,867 B1 | 3/2002 | Forster |
| 6,360,374 B1 | 3/2002 | Adler |
| 6,385,817 B1 | 5/2002 | Johnson |
| 6,427,251 B1 | 8/2002 | Leach |
| 6,770,581 B1 * | 8/2004 | DeMott et al. .............. 442/312 |
| 2001/0049017 A1 | 12/2001 | Clarke |
| 2002/0004114 A1 | 1/2002 | Leaphart, Jr. et al. |
| 2002/0034912 A1 | 3/2002 | Curro et al. |
| 2002/0098763 A1 | 7/2002 | Yoshikawa et al. |
| 2003/0106568 A1 * | 6/2003 | Keck et al. ..................... 134/6 |
| 2004/0058102 A1 | 3/2004 | Baychar |
| 2004/0116022 A1 | 6/2004 | Langley |
| 2005/0044650 A1 * | 3/2005 | Goldberg et al. ........... 15/229.1 |

FOREIGN PATENT DOCUMENTS

| | | |
|---|---|---|
| JP | 3-180558 | 8/1991 |
| WO | WO 01/71079 A3 | 9/2001 |

OTHER PUBLICATIONS

Rogue River Sports Company Information, website at seatshield.com.

PCT/US04/30962 International Search Report dated Nov. 21, 2005.

Yasuda, T.; Miyama, M.; and Yasuda, H. "Dynamic Water Vapor and Heat Transport Through Layered Fabrics. Part II. Effects of the Chemical Nature of Fibers." *Textile Research Journal*, 62 (4), Apr. 1992, p. 227-235.

Prahsarn, C.; Barker, R. L.; and Gupta, B. S. "Moisture Vapor Transport Behavior of Polyester Knit Fabrics." *Textile Research Journal*, 75 (4), Apr. 2005, p. 346-351.

Rajagopalan, Dilip; Aneja, Arun P; and Marchal, Jean-Marie. "Modeling Capillary Flow in Complex Geometries." *Textile Research Journal*, 71 (9), Sep. 2001, p. 813-821.

Harper, R. J. Jr.; Bruno, J. S.; Blanchard, E. J.; and Gautreaux, G. A. "Moisture-related Properties of Cotton-Polyester Fabrics," *Textile Research Journal*, 46 (2), Feb. 1976, p. 82-90.

Corbellini, E. "Polypropylene for active clothing." *Textile Month*, Nov. 1987, p. 37-38.

Ghali, K.; Jones, B.; and Tracy, J. "Modeling moisture transfer in fabrics." *Experimental Thermal and Fluid Science*, 9 (3), Oct. 1994, p. 330-336.

Haghi, A. K. "Transport phenomena in porous media: A review." *Theoretical Foundations of Chemical Engineering*, 40 (1) Jan. 2006, p. 14-26.

Nguyen, H. V.; and Durso, D. F. "Absorption of water by fiber webs: an illustration of diffusion transport." *Tappi Journal*, 66 (12), Dec. 1983, p. 76-79.

Matsudaira, M.; and Kondo, Y. "Effect of a grooved hollow in a fiber on fabric moisture- and heat-transport properties." *Journal of the Textile Institute, Part 1: Fiber Science and Textile Technology*, 87 (3), 1996, p. 409-416.

Vaughn, Edward A.; and Carman, Brent G. "Expanded Surface Area Fibers: A Means for Medical Product Enhancement." *Journal of Industrial Textiles*, 30 (4), Apr. 2001, p. 303-310.

Goswami, B. C.; and Ellison, M.S. "New capillary surface fibers." *Man-Made Fiber Year Book*, Aug. 2002, p. 34-38.

* cited by examiner

ENGINEERED TOWELING

FIELD OF INVENTION

The present invention relates to articles of manufacture for cleaning and wiping. In particular, the present invention relates to towels that are specifically engineered for particular uses.

BACKGROUND OF THE INVENTION

In modern times, physical fitness has become of greater interest. People have achieved their fitness goals through an increasingly diverse number of sport-related activities, such as swimming, running, weight lifting, mountain biking, and other such sports. This increase in sport-related activities correlates to an increase in exposure to different types of moisture and soilage, not the least of which include, sweat, mud, grit, grime, pool water, shower water, even blood.

Despite these changes in physical fitness, the common towel has remained the same. Today, all towels are basically a single layer fabric made of a uniform absorbent material. The common towel is inadequate to meet the needs of today's athletes.

Accordingly, there is a need for tactical, situation-specific moisture management tools that are more effective then common towels.

SUMMARY OF THE INVENTION

The present invention is directed to an article of manufacture for drying or wiping a surface. These articles can include a first layer and a second layer coupled to the first layer. The first layer can have at least one layer of a microfiber fabric, and the a second layer can have at least one layer of a microfiber fabric. The microfiber fabric of the first and second layers can have a characteristic independently selected from the group consisting of moisture wicking ability, moisture absorbing ability, wiping ability, cleaning ability, and combinations thereof. Preferably, the first and second layers are coupled by stitching along the periphery and substantially parallel lines of stitching along the inner surface areas of the layers.

In another embodiment, the present invention is directed to an article of manufacture for drying or wiping a surface, which includes a first layer, a second layer coupled to the first layer, and a third layer coupled in between the first and second layers. The first layer has at least one layer of a fabric; the second layer has at least one layer of a fabric; and the third layer has at least one layer of a moisture mediator. The fabric of the first and second layers can have independent characteristics, as described above. The third layer can have a surface area that is a portion of either the surface areas of the first layer or the second layer, so that the first and second layers can be coupled adjacent to each other in certain areas and the third layer is coupled between the first and second layers in certain other areas. When the third layer has a substantially smaller surface area, it is preferred to locate the third layer surface area in the middle of the surface areas of the first and second layers. It is preferable to couple the multiple layers by periphery stitching and substantially parallel lines of stitching along the inner surface areas of the layers

BRIEF DESCRIPTION OF THE DRAWINGS

While the specification concludes with claims particularly pointing out and distinctly claiming the subject matter, which is regarded as defining the present invention, it is believed that the invention will be better understood from the following description taken in conjunction with the following accompanying drawings:

DETAILED DESCRIPTION OF THE INVENTION

Figure 1:
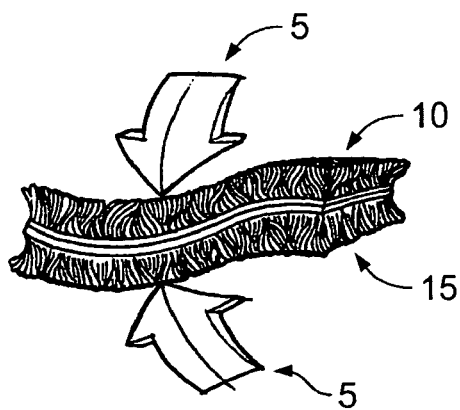
FIG. 1 is an illustration of a cross-section of one embodiment of the present invention.

The present invention is directed to towels that are configured for wiping a surface, e.g., skin, body part, or equipment. These towels have two or more layers of material. Since each layer of the towel can be chosen to have unique characteristics, the towels of the present invention can be designed to meet almost any desired purpose or combination of purposes for wiping a surface. The towels include at least a first having at least one fabric layer coupled to a second layer having at least one fabric layer. The fabric layers can be independently chosen to have the same or different characteristics. For example, one external layer can be chosen to have a surface with a course texture and the other external layer can be chosen to have a fine or soft texture. Although each layer may conform to the shape and size of the other layer, the multiple layers may have different shapes and sizes so that the towel may have multiple layers in certain areas and a single layer in other areas.

The term "fabric," as used herein, a cloth-like material made from fibers. Fabrics can be made from an ordered arrangement of fibers or a mesh of fibers. Fabrics can be textiles, which are typically made by knitting or weaving fibers made of various natural and/or synthetic materials. As is well known in the art, the fabric characteristics (e.g., texture) are determined by the fiber characteristics and the weave characteristics. The fibers can have a variety of mechanical, structural and chemical characteristics. For example, natural and synthetic fibers can be used, and the fibers can be treated with coatings to make the fiber more hydrophilic or increase their strength. Fibers can also be tailored to have a desired cross-sectional shape. Similarly, the characteristics of the fabric can be modified by changing the variables for the weaving or knitting process. These variables include, but are not limited to, weave patterns (e.g., single knit, double knit, and waffle patterns), loop characteristics (e.g., length, depth, and breadth of the loop), fiber angles, individual fiber exposure, pile characteristics, and combinations thereof. By changing the fiber characteristics and the weave characteristics, the textile manufacturer can produce a fabric that has any number of desired characteristics. For example, desirable fabric characteristics for toweling applications include moisture wicking ability, moisture absorbing ability, wiping ability, scrubbing ability, cleaning ability, and combinations thereof.

Each fabric layer of the present invention can be made from any fabric known to the skilled artisan. Useful natural fabrics include, but are not limited to, fabrics made from natural fibers, such as cotton, silk, linen, and combinations thereof. Useful synthetic fabrics include, but are not limited to, fabrics made from synthetic fibers, such as polyester, polyamide (nylon), rayon, acrylic, and combinations thereof. Fabrics can be obtained from any combination of the fibers described above, wherein the fibers have a weight from about 35 grams to about 850 grams/m².

Preferably, a fabric layer is made of a synthetic fiber having a denier of from about 0.01 to about 50, referred hereinafter as microfiber fabric. The fabric layer is more preferably made of a microfiber having a denier of from about 0.01 to about 0.99. The fabric layer can utilize a split microfiber, unsplit microfiber, or a combination thereof. Nonlimiting examples of useful materials include: microfiber fabrics, such as MFT 1, 2, 3, 5, 8, 11.3, and 35, I100, SU1 and SU3, which are commercially available from Leading Edge Products located in San Diego, Calif.; microfibers made with polyester and polyamide in a weight percentage ratio ranging from about 50/50 to about 90/10; microfibers made from 100% polyester; and microfibers made from 100% polyamide (nylon). Microfibers are useful because after the fibers are spun extruded, they can be split to create furrows and channels. These furrows and channels help provide a capillary action, which draws moisture into the void spaces. Since there can be from about 90,000 to about 180,000 microfibers per sq. in., the fabric has a large surface area available for contact with a moist surface. Similarly, the large number of fibers also provides a proportional amount of capillary action and void space into which the moisture can be drawn.

FIG. 1 illustrates a cross-section of one embodiment of the present invention having two fabric layers. In this embodiment a first microfiber fabric layer 10 is coupled to a second microfiber fabric layer 15 to form a two layer towel that is capable of quickly removing moisture 5. As illustrated, both fabric layers can be a single knit microfiber terry cloth. One useful single knit microfiber terry cloth is MFT1, a textile made of a synthetic microfiber of 80% polyester and 20% nylon. MFT1 is useful for fast drying because the microfibers are split to create furrows and channels that provide a capillary drying effect. MFT1 also has the following characteristics: the loop size is less than 1 mm and the loops lay somewhat flat relative to the warp of the fabric; the weave pattern is in the form of a double knit terry; the fiber size is from about 0.02 to about 0.99 denier; and the fibers are substantially round and can be produced by spun, extrusion, and then splitting using chemical or heat processes. The individual fabric layers of this embodiment can be made of the same or different microfiber fabrics.

In another embodiment of the present invention, the towels of the present invention have three layers of material. A first layer having at least one fabric layer that is coupled to a second layer having at least one fabric layer, and the fabric layers can be independently chosen from any of the fabrics discussed above. Preferably, at least one of the first or second layers is a microfiber fabric layer, as discussed above. Accordingly, the first and second layers can have the same or difference fabrics. This embodiment further includes a third layer having at least one layer of a moisture mediator, which, as used herein, encompasses materials that can substantially absorb or hold moisture and materials that can substantially resist moisture. The third layer is coupled in between the first and second layers, as further described below. Since each layer can be independently chosen to have different characteristics, the three-layered towel can meet multiple functionalities.

Figure 5:
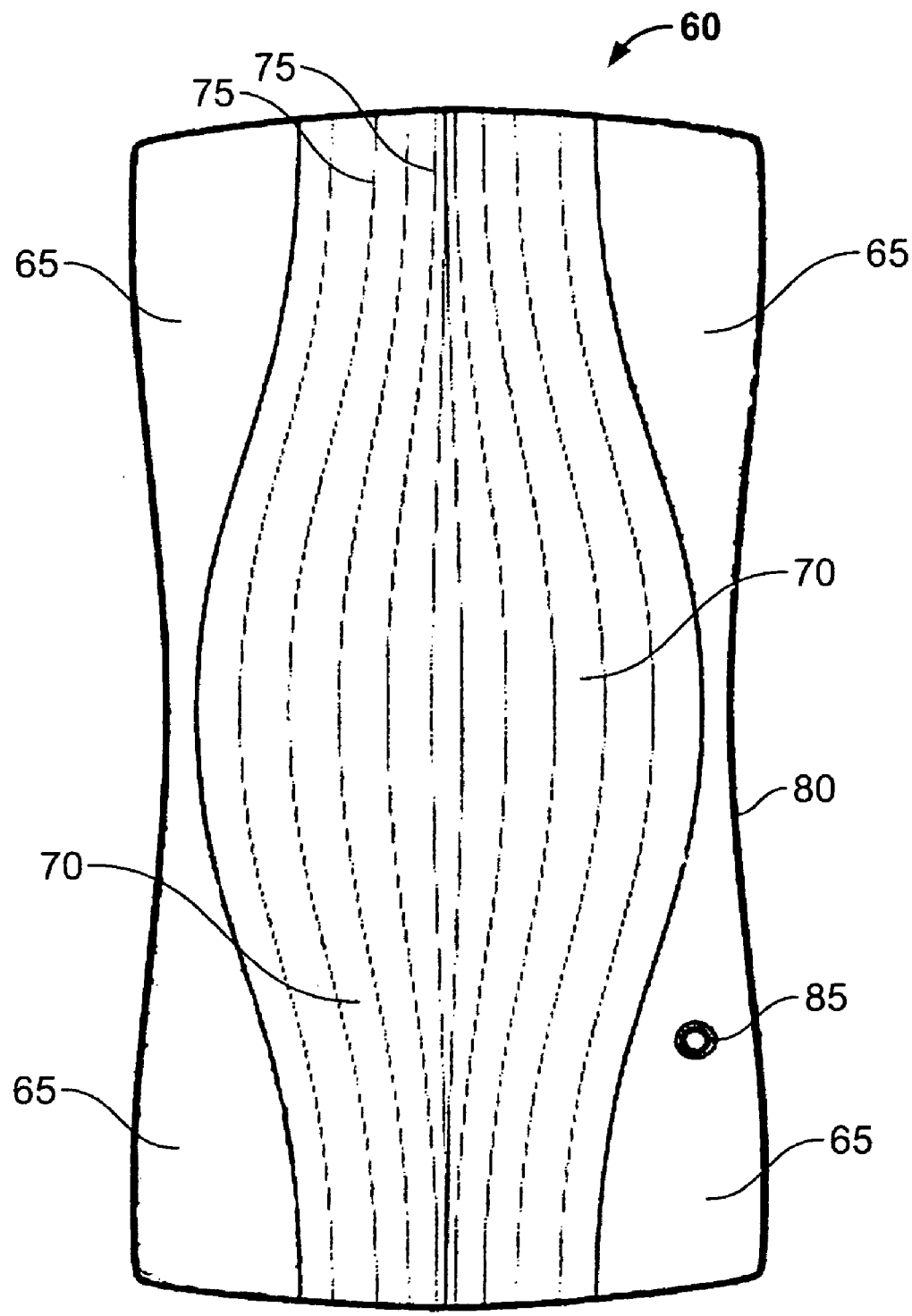
FIG. 5 is an illustration of the top view of another embodiment of the present invention.

The first and second layers may have the same or different shape and size so that the towel may have multiple layers in certain areas and a single layer in other areas. Similarly, the third layer can conform to the shape and size of the first layer, the second layer, or both first and second layers. Alternatively, the surface area of the third layer can be smaller than the surface areas of either the first layer or the second layer. The third layer surface area can also be smaller than the surfaces areas of both the first and second layers, so that the first and second layers are coupled adjacent to each other in certain areas of the towel and the third layer is coupled between the first and second layers in other areas of the towel. When the third layer surface area is smaller than both first and second layer surface areas, it is preferable to position the third layer generally in the middle or in a central location of the surface areas of the first and second layers, when view from a top view as shown in FIG. 5. Accordingly, the third layer can also be discontinuous. For example, a third layer portion can be configured to in between the first and second layer in the corner areas of the towel.

When the moisture mediator is a moisture-resistant material, the first and second layers can be used separately to provide the benefits of having two independent towels that can be separately wetted or soiled. In other words, a user can use one side of the towel without soiling or wetting the other side of the towel. This functionality is especially useful when the first and second layers have different characteristics. Furthermore, separating the two fabric layers with the moisture layer doubles the useable surface area of the towel, because each side can be independently used. A small towel, therefore, can provide the functional effectiveness of a much larger towel.

Moisture-resistant materials include any material known in the art that prevents or hinders passage of water and other fluids through it. Accordingly, moisture-resistant materials can include water-resistant materials and waterproof materials. The moisture-resistant material is preferably flexible, and it is also preferably machine washable. Examples of suitable moisture-resistant materials include, but are not limited to, plastics, such as polyester, polyamide (nylon), rayon, acrylic, acrylonitryl butadiene styrene (ABS), polystyrene, polyethylene, polypropylene, polyurethane and combinations thereof; Goretex©-like fabrics; rubber containing materials; and combinations thereof.

Figure 2:
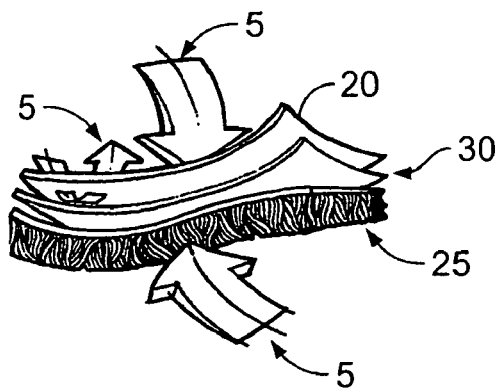
FIG. 2 is an illustration of a cross-section of another embodiment of the present invention.

FIG. 2 illustrates a cross-section of an embodiment of the present invention having two fabric layers and a third moisture-resistant material. In this embodiment, a first fabric layer 20 is coupled to a second fabric layer 25, and a third moisture-resistant material 30 coupled in between the first and second layers. As illustrated, first fabric layer 20 and second fabric layer 25 can have different characteristics. For example, first fabric layer 20 can be made of a chamois fabric, having a smooth surface. One useful chamois material is I100, a textile made of a synthetic microfiber of 80% polyester and 20% nylon. I100 is ideal for blotting because the microfibers stand perpendicular to the warp and are extremely short. I100 has the following additional characteristics: no loops individual strands of fibers; the weave pattern is double knit; the fiber size is from about 0.2 to about 0.99 denier; and the fibers are by spun, extrusion and then splitting using chemical or heat processing. The second fabric layer 25 can be made of a single knit terry cloth, such as MFT1, that quickly absorbs moisture 5, as described above. The moisture-resistant third layer can be made of a rip-stop nylon, which is commercially available from Britex Fabrics located in San Francisco, California. As illustrated, Even when the chamois material of first layer 20 is overloaded with moisture 5, second layer 25 is protected by the third moisture-resistant layer.

When the moisture mediator is a moisture-absorbing material, it is believed that the moisture mediator can be used to store water and fluids, thereby helping to pull or wick moisture away from the first and second layers for storage in between the first and second layers. The moisture-absorbing material, therefore, helps maintain a gradient of moisture that allows first and second layers to absorb more than each layer by itself.

Moisture-absorbing materials include any material known in the art that can substantially absorb or hold water and other fluids. The moisture-absorbing material is preferably machine washable. Suitable moisture-absorbing materials include, but are not limited to, any of the fabrics described above.

Figure 3:
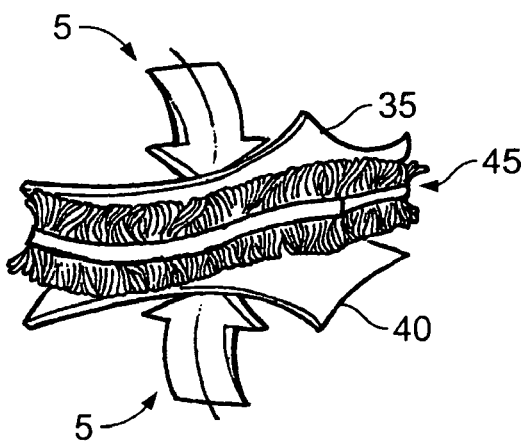
FIG. 3 is an illustration of a cross-section of another embodiment of the present invention.
Figure 4:
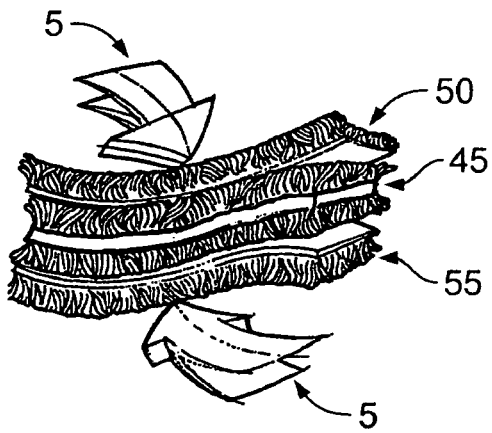
FIG. 4 is an illustration of a cross-section of another embodiment of the present invention.

FIGS. 3 and 4 illustrate the cross-section of two embodiments of the present invention having three fabric layers. In the embodiment of FIG. 3, first fabric layer 35 and second fabric layer 40 are made of a chamois material, such as I100, and the third layer 45 is an absorbent textile. One useful absorbent textile is MFT8, a textile made of a synthetic microfiber of 80% polyester and 20% nylon. MFT8 is useful for fast moisture absorption and storage because the microfibers are split to create furrows and channels that provide a capillary drying effect. MFT8 also has the following characteristics: the loop size is about 1 mm in diameter, and the loops stand perpendicular to the warp; the weave pattern is double knit terry; the fiber size is from about 02 to about 0.99 denier; and the fibers are produced by spun extrusion and then splitting using chemical or heat processes. In the embodiment of FIG. 4, first fabric layer 50 and second fabric layer 55 are single layers of a single knit material, such as MFT1, and the third layer 45 is a single layer of an absorbent textile, such as MFT8.

The layers of the towel described above can be coupled together by any method known to the skilled artisan. For example, the two or more layers can be coupled together by stitching, gluing, bonding (such as, by utilizing heat, pressure, fusion, a chemical agent, or any combination thereof), melt blowing, and the like. It is preferable to use a coupling method that allows repeated washing and drying. The layers of the towel are more preferably stitched together, and most preferably stitched together utilizing substantially parallel lines of stitching. The substantially parallel lines of stitching can have curves and can intersect at the edges of the towel. Without being limited to any one theory, it is believed that substantially parallel lines of stitching allows quicker hang drying of the multi-layered towels of the present invention by creating channels to help direct moisture to the edges. This feature would be especially helpful for embodiments described herein that are designed to absorb large amounts of moisture.

FIG. 5 illustrates another embodiment of the invention having three fabric layers. The three-layered towel 60 has a first and second fabric layer made of MFT1, and the size and shape of first layer conforms to the size and shape of the second layer. A third moisture-absorbing layer made of MFT8 is placed in between the two fabric layers. In this embodiment, the third layer, which has a substantially smaller surface area than both the first and second layers, is positioned substantially in the middle of the surface areas of the first and second layers. As a result, corner areas 65 of three-layered towel 60 have the first layer coupled only to the second layer. Middle or central areas 70 of three-layered towel 60 have the third layer coupled in between the first and second layers. In the embodiment illustrated in FIG. 5, the substantially parallel lines of stitching 75 couple the three layers in the middle or central areas 70. The edges 80 of three-layered towel 60 can also be coupled by stitching. This embodiment also includes a hanging hole 85 to facilitate hang drying. The hanging hole 85 may be sewn, like a very large buttonhole, or it may have a grommet to provide added strength, structure and strength. Alternatively, hanging hole 85 can be obtained by forming a hole and stitching additional fabric to reinforce the edges of the hole.

What is claimed is:

1. An article of manufacture for drying or wiping a liquid on a surface, comprising:
    a first layer of a fabric consisting of a split microfiber with furrows and channels to create capillary action and void space in the first layer into which the liquid can be drawn;
    a second layer of a fabric consisting of a split microfiber with furrows and channels to create capillary action and void space in the second layer into which the liquid can be drawn, portions of the second layer coupled to portions of the first layer in those areas in which there is no other fabric layer between the first and second layers; and
    a third layer consisting of a moisture mediator, the third layer coupled in between portions of the first layer and portions of the second layer such that when the third layer is intermediate the first and second layers, the third layer mediates the transport of moisture from the first layer and moisture from the second layer;
    coupler means to couple the three layers together in areas where all three layers overlap such that the three layers remain separate and distinct from each other except at limited points of contact caused by the coupling means where the first and third layers and the second and third layers are in fixed in contact with each other.

2. The article of claim 1, wherein the fabric of the first and second layers has a characteristic independently selected from the group consisting of moisture wicking ability, moisture absorbing ability, wiping ability, cleaning ability, and combinations thereof; and wherein the third layer comprises a moisture-absorbing material.

3. The article of claim 2, wherein the fabric of the first and second layers is independently selected from the group consisting of fabrics made from natural fibers, fabrics made from synthetic fibers, and combinations thereof and wherein the third layer comprises a material selected from the group consisting of fabrics made from natural fibers, fabrics made from synthetic fibers and combinations thereof.

4. The article of claim 1, wherein the fabric of the first and second layers has a characteristic independently selected from the group consisting of moisture wicking ability, moisture absorbing ability, wiping ability, cleaning ability, and combinations thereof; and wherein the third layer comprises a moisture-resistant material.

5. The article of claim 4, wherein the fabric of the first and second layers is selected from the group consisting of fabrics made from natural fibers, fabrics made from synthetic fibers, and combinations thereof and wherein the third layer comprises a material selected from the group consisting of plastics, Gortex-like fabrics, rubber-containing materials, and combinations thereof.

6. The article of claim 1, wherein the third layer surface area is centrally located in relation to the surface areas of the first and second layers.

7. The article according to any one of claims 1, 2, 3 and 6, wherein the coupler means is stitching along the periphery and stitching along the inner surface areas of the layers in substantially parallel lines.

8. An article of manufacture for drying or wiping a liquid on a surface, comprising:
    a first layer of a microfiber fabric consisting of a split microfiber with furrows and channels to create capillary action and void space in the first layer into which the liquid can be drawn;

a second layer of a microfiber fabric consisting of a split microfiber with furrows and channels to create capillary action and void space in the second layer into which liquid can be drawn, portions of the second layer coupled to portions of the first layer in those areas in which there is no fabric intermediate the first and second layers;

a third layer consisting of a split microfiber fabric having moisture-absorbing properties, the third layer coupled in between portions of the first layer and portions of the second layer such that when the third layer is between the first and second layers, the third layer absorbs liquid from the first and second layers; and coupler means to couple the three layers together in areas where all three layers overlap such that the three layers remain separate and distinct from each other except at limited points of contact caused by the coupling means where the first and third layers and the second and third layers are in fixed contact with each other.

9. The article of claim 8, wherein the first layer comprises a chamois microfiber, the second layer comprises a chamois microfiber, and the third layer comprises a terry microfiber.

10. The article of claim 8, wherein the first layer comprises a single-knit terry microfiber, the second layer comprises a single-knit terry microfiber, and the third layer comprises a double-knit microfiber.

11. The article of claim 8, wherein the third layer has a surface area that is a portion of either the surface areas of the first layer or the second layer, wherein the first and second layers are coupled adjacent to each other in certain areas, and wherein the third layer is coupled between the first and second layers in certain other areas.

12. The article of claim 8, wherein the third layer surface area is centrally located in relation to the surface areas of the first and second layers.

13. The article according to any one of claims 8 and 12, wherein the coupler means is stitching along the periphery and stitching along the inner surface areas of the layers in substantially parallel lines.

14. An article of manufacture for drying or wiping a surface, comprising:

a first layer of a microfiber fabric, the of a microfiber fabric consisting of a split microfiber with furrows and channels to create capillary action and void space in the first layer into which the liquid can be drawn;

a second layer of a microfiber fabric consisting of a split microfiber with furrows and channels to create capillary action and void space in the second layer into which liquid can be drawn, the second layer coupled to portions of the first layer in those areas in which there is no other fabric layer between the first and second layers, and a third layer coupled in between the first and second layers such that when the third layer is intermediate the first and second layers, the third layer mediates the transport of moisture from the first layer and moisture from the second layer, the third layer comprising at least one layer of a moisture-resistant material;

coupler means to couple the three layers together in areas where all three layers overlap such that the three layers remain separate and distinct from each other except at limited points of contact caused by the coupling means where the first and third layers and the second and third layers are in fixed contact with each other;

wherein the article is configured for wiping a surface.

15. The article of claim 14, wherein the first layer comprises a chamois microfiber, the second layer comprises a terry microfiber, and the third layer comprises a rip-stop nylon.

16. The article of claim 14, wherein the first layer comprises an external layer of a double-knit terry microfiber and an internal layer of single-knit terry microfiber with the nap facing towards the external layer, wherein the second layer comprises an external layer of a double-knit terry microfiber and an internal layer of single-knit terry microfiber with the nap facing towards the external layer, and the third layer comprises a rip-stop nylon.

17. The article of claim 14, wherein the third layer has a surface area that is a portion of either the surface areas of the first layer or the second layer, wherein the first and second layers are coupled adjacent to each other in certain areas, and wherein the third layer is coupled between the first and second layers in certain other areas.

18. The article of claim 17, wherein the third layer surface area is centrally located in relation to the surface areas of the first and second layers.

19. The article according to any one of claims 14, 15, 16 and 17, wherein the layers are coupled by stitching along the periphery and by stitching along the inner surface areas of the layers in substantially parallel lines.

\* \* \* \* \*